US011148340B2

(12) United States Patent
Prinzo et al.

(10) Patent No.: US 11,148,340 B2
(45) Date of Patent: Oct. 19, 2021

(54) FILTRATION DEVICE AND FILTRATION METHOD FOR POLYMER EXTRUSION

(71) Applicant: C M PRODUZIONE S.R.L., Rescaldina (IT)

(72) Inventors: Carmine Prinzo, Cerro Maggiore (IT); Alessio Prinzo, Cerro Maggiore (IT)

(73) Assignee: C M PRODUZIONE S.R.L., Rescaldina (IT)

( * ) Notice: Subject to any disclaimer, the term of this patent is extended or adjusted under 35 U.S.C. 154(b) by 323 days.

(21) Appl. No.: 16/086,847

(22) PCT Filed: Mar. 21, 2017

(86) PCT No.: PCT/IB2017/051630
§ 371 (c)(1),
(2) Date: Sep. 20, 2018

(87) PCT Pub. No.: WO2017/163180
PCT Pub. Date: Sep. 28, 2017

(65) Prior Publication Data
US 2019/0091916 A1    Mar. 28, 2019

(30) Foreign Application Priority Data

Mar. 21, 2016  (IT) .......................... 102016000028993

(51) Int. Cl.
*B29C 48/692*  (2019.01)
*B29C 48/255*  (2019.01)
*B29C 48/691*  (2019.01)

(52) U.S. Cl.
CPC ........ *B29C 48/692* (2019.02); *B29C 48/2554* (2019.02); *B29C 48/6912* (2019.02)

(58) Field of Classification Search
None
See application file for complete search history.

(56) References Cited

U.S. PATENT DOCUMENTS 2,507,311 A * 5/1950 Lodge .................. B29C 48/692
                                                        241/79
3,471,017 A * 10/1969 Kalman ................. B01D 37/00
                                                        210/774

(Continued)

FOREIGN PATENT DOCUMENTS

AT        410076 B     1/2003
DE        1131875 B    6/1962

(Continued)

OTHER PUBLICATIONS

International Search Report and Written Opinion dated Jun. 23, 2017 issued in PCT/IB20171/051630.

(Continued)

*Primary Examiner* — Robert J Popovics
(74) *Attorney, Agent, or Firm* — Scully, Scott, Murphy & Presser, P.C.

(57) ABSTRACT

A filtration device for extrusion processes, which comprises a material intake channel, which splits into a first intake channel and a second intake channel leading to a first filter chamber and a second filter chamber, the first and second filter chambers being provided in output with a first output channel and a second output channel, which in turn merge into a channel that is adapted to convey the material to an extrusion head.

10 Claims, 4 Drawing Sheets

(56) References Cited

U.S. PATENT DOCUMENTS

| | | | | |
|---|---|---|---|---|
| 3,672,507 A | * | 6/1972 | Paull, Jr. | B01D 29/096 210/774 |
| 3,855,126 A | * | 12/1974 | Smith | B29C 48/692 210/780 |
| 3,856,674 A | | 12/1974 | Kalman | |
| 4,842,750 A | * | 6/1989 | Britchi | B29C 48/692 210/791 |
| 4,849,113 A | * | 7/1989 | Hills | B01D 29/09 210/741 |
| 4,888,110 A | * | 12/1989 | Fogarty, Jr. | B01D 29/76 210/106 |
| 4,925,560 A | * | 5/1990 | Sorrick | B01D 39/086 210/387 |
| 5,308,508 A | * | 5/1994 | Womack | B01D 29/096 210/767 |
| 5,320,753 A | * | 6/1994 | Keillor, III | B01D 33/04 210/398 |
| 5,556,592 A | * | 9/1996 | Hitchings | B01D 29/096 164/134 |
| 5,676,731 A | * | 10/1997 | Hitchings | B01D 29/096 164/134 |
| 6,149,807 A | * | 11/2000 | Previero | B01D 29/096 210/236 |
| 6,994,795 B2 | * | 2/2006 | Bacher | B29C 48/692 210/780 |
| 10,307,953 B2 | * | 6/2019 | Panebianco | B29C 48/692 |
| 10,807,295 B2 | * | 10/2020 | Kastner | B29C 48/2725 |
| 2003/0178740 A1 | * | 9/2003 | Bacher | B29C 48/395 264/169 |
| 2006/0021948 A1 | * | 2/2006 | Dolan | B29C 48/692 210/741 |
| 2006/0021949 A1 | * | 2/2006 | Dolan | B29C 48/692 210/741 |
| 2013/0068252 A1 | * | 3/2013 | Ager | B01D 29/09 134/9 |
| 2014/0305853 A1 | * | 10/2014 | Panebianco | B29C 48/2725 210/97 |
| 2014/0353261 A1 | * | 12/2014 | Cavanagh | B29C 48/692 210/783 |
| 2018/0065288 A1 | * | 3/2018 | Kastner | B29C 48/692 |
| 2019/0091916 A1 | * | 3/2019 | Prinzo | B29C 48/692 |

FOREIGN PATENT DOCUMENTS

| | | | |
|---|---|---|---|
| DE | 19722352 A1 | 11/1997 | |
| DE | 102008014054 A1 | 9/2009 | |
| EP | 0275462 A2 * | 7/1988 | B01D 29/606 |
| EP | 0275462 A2 | 7/1988 | |
| EP | 0919353 A2 | 6/1999 | |
| FR | 2332113 A1 | 6/1977 | |
| GB | 1168063 A | 10/1969 | |
| JP | 2003-127168 A | 5/2003 | |

OTHER PUBLICATIONS

Italian Search Report and Written Opinion dated Dec. 8, 2016 issued in IT UA20161836, with partial translation.

* cited by examiner

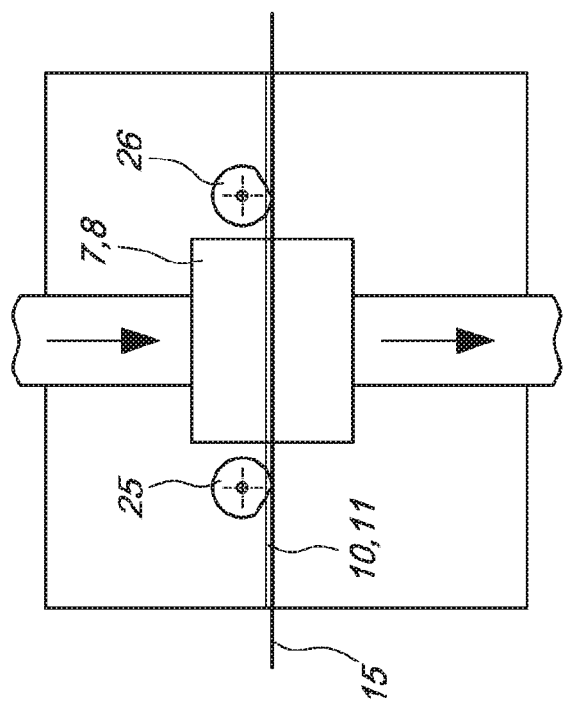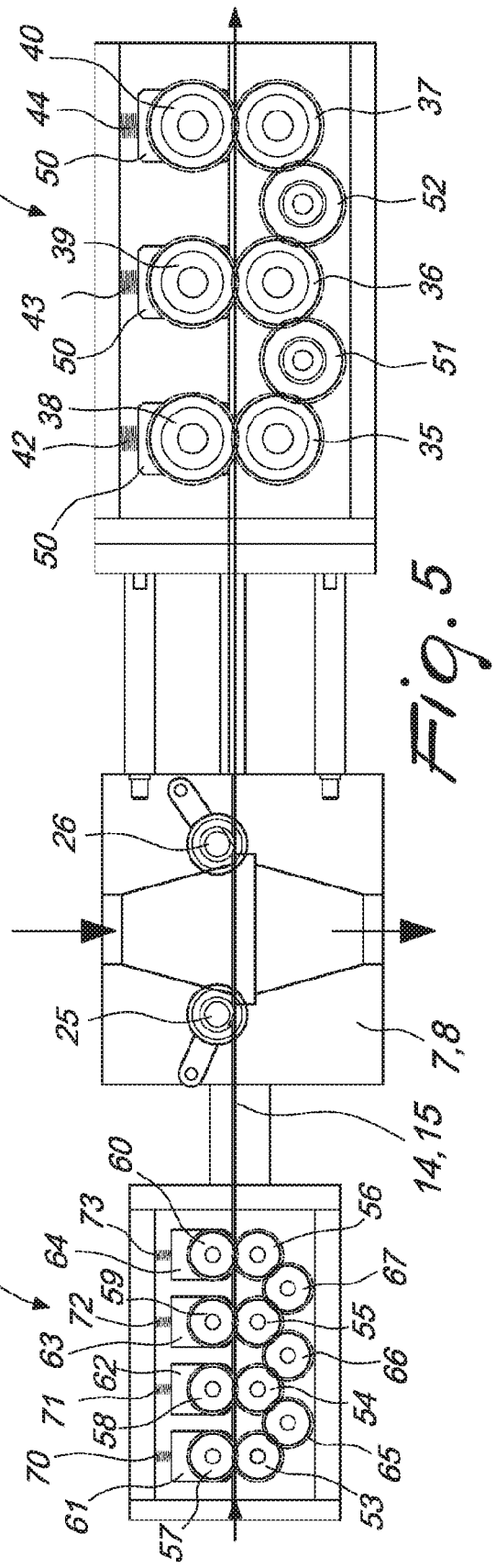

FILTRATION DEVICE AND FILTRATION METHOD FOR POLYMER EXTRUSION

The present invention relates to a filtration device for extrusion processes without interruptions. More specifically, the invention relates to an automatic filtration device with continuous flow metal mesh ribbons for extrusion processes without interruptions.

As is known, in an extrusion process of plastic materials to be regenerated with a high presence of impurities, a filtration device is used, the function of which is to eliminate all the impurities present in the material before obtaining the final product.

The filtration process conveys the plastic material pushed by the extruder to a filtration chamber, where the material encounters and passes through a metal mesh the function of which is to retain all the impurities present.

In conventional filtering devices, the metal filtration mesh, or filtering mesh ribbon, needs to be replaced by introducing a new portion of mesh from the ribbon every time such filtration mesh is "used".

Furthermore, even more importantly, conventional filtering devices that use metal mesh ribbon use, for the filtration process, a single channel that feeds a single filtration chamber. This has limitations.

In fact, there is a discontinuous output flow, since in order to advance the ribbon of mesh and remove the pressure in the filtration chamber one has to temporarily redirect the materials to a secondary accumulation cell and thus interrupt the output flow.

Furthermore, there are factors of counter-pressure given that, once the mesh ribbon has been regenerated, the material accumulated in the accumulation cell is again pushed toward the entry channel, meeting the flow that exits from the extruder. This results in a considerable increase in pressure and the risk that the material could back up toward the extruder, thus halting the cycle.

Furthermore, the only end product it is possible to obtain is regranulate, given that this is the only product that can be obtained with a discontinuous flow and it cannot be incorporated in extrusion process of casting, blowing, or coating with foil and sheet, in order to obtain film as the final product (for which a constant and continuous flow is required).

Even furthermore, there is a limitation of the filtered materials, given that some materials do not tolerate differences in pressure and being redirected in the extrusion process.

Conventional solutions for introducing a new ribbon involve bonding the two ribbons, the old one and the new one, at their ends, for the purpose of using the old ribbon to entrain the new ribbon into the filtration device. Such method is difficult and precarious, since if the bonding is not carried out perfectly it can break and the new ribbon is no longer entrained by the old one, thus halting the filtration process.

Furthermore, if the two ribbons are not joined by overlapping them perfectly, the mesh can become jammed in the sliding chamber for its passage, thus halting the filtration process.

Even furthermore, conventional systems advance the mesh with toothed rollers that engage with each other; the mesh is made to pass between the head of the tooth of one roller and the base of the tooth of the next corresponding roller, thus undergoing deformations. Furthermore, sometimes, the force imparted to the mesh can cause tears or the breakage of the mesh and therefore possible interruptions of the production cycle. In substance, therefore, conventional systems for transmitting motion from the drive roller to the next, adjacent roller must necessarily have the rollers interfere with each other with the mesh ribbon in between them.

The aim of the present invention is to provide a filtration device for extrusion processes that makes it possible to perform a filtration without the extrusion process being interrupted in any way.

Within this aim, an object of the present invention is to provide a filtration device for extrusion processes that makes it possible to substitute the ribbon material for the filtration without needing to use a process of bonding between the old ribbon and the new one.

Another object of the present invention is to provide a filtration device for extrusion processes that can also be used in extrusion processes for obtaining a film in output, in which a constant and continuous flow of material is required.

Another object of the present invention is to provide a filtration device that is highly reliable, easily and practically implemented and low cost.

This aim and these and other objects which will become better apparent hereinafter are achieved by a filtration device for extrusion processes, which comprises a material intake channel, which splits into a first intake channel and a second intake channel leading to a first filter chamber and a second filter chamber, said first and second filter chambers being provided in output with a first output channel and a second output channel, which in turn merge into a channel that is adapted to convey the material to an extrusion head.

Further characteristics and advantages of the invention will become better apparent from the description of a preferred, but not exclusive, embodiment of the filtration device according to the present invention, which is illustrated by way of non-limiting example in the accompanying drawings wherein:

FIG. 4 is a plan view from above of an enlarged detail of FIG. 3;

FIG. 5 shows a detail of the device according to the invention.

Figure 1:
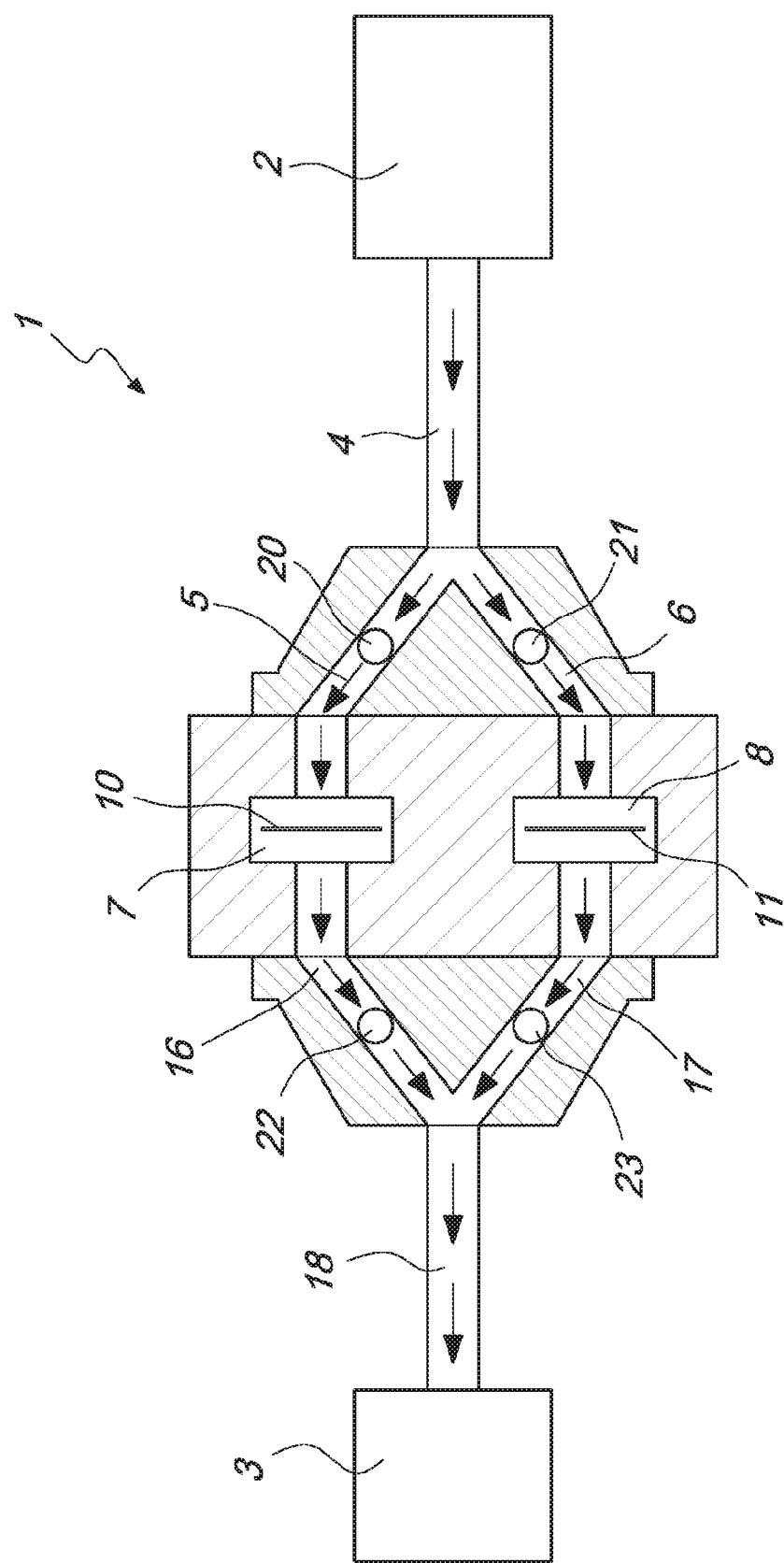
FIG. 1 is a cross-sectional schematic view of the filtration device according to the invention inserted into an extrusion process.

With reference to the figures, the filtration device according to the present invention, generally designated by the reference numeral 1, is adapted to be interposed between an extruder 2 and an extrusion head 3. The filtration device according to the invention comprises a first section in which there is an intake channel 4, which splits into a first channel 5 and a second channel 6 for conducting the material in output from the extruder 2 to a first filter chamber 7 and to a second filter chamber 8, respectively.

The first filter chamber 7 and the second filter chamber 8 are conveniently provided with a sliding slot, respectively 10 and 11, which allows a filtration ribbon, made of mesh, 14 and 15, to be passed through.

The first and second filter chambers 7 and 8 send their output respectively to a first and a second output channel, 16 and 17, which merge into a channel 18 that leads to the extrusion head 3.

Ultimately, therefore, the flow in output from the extruder 2 is separated into two separate branches, which are conveyed to the two separate filter chambers 7 and 8, in order to be then remerged into a single flow, downstream of the filter chambers 7 and 8, in order to enter the extrusion head 3.

Each intake channel to the filter chambers 7 and 8, i.e. the channels 5 and 6, is provided with a flow valve, 20 and 21, respectively, as the output channels 16 and 17 are respectively provided with flow valves 22 and 23.

The flow valves 20, 21, 22 and 23 make it possible to interrupt the flow and remove pressure from the filter chambers 7 and 8.

Figure 2:
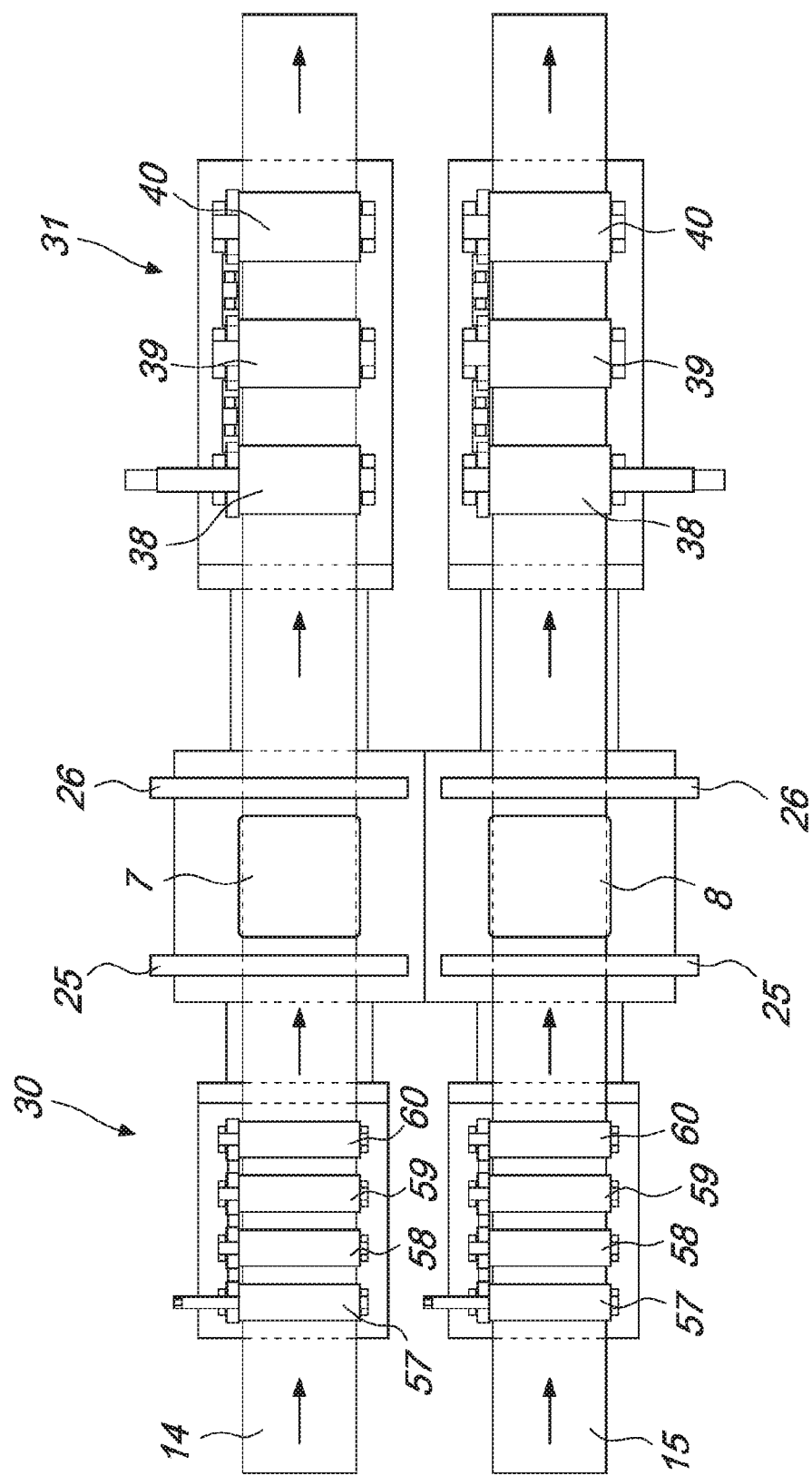
FIG. 2 is a front elevation view of a detail of the filtration device according to the present invention.

The mesh filtration ribbons 14 and 15, which are shown in detail in FIG. 2, are locked in the respective filter chambers 7 or 8 by way of locking elements 25, 26, which are constituted by, for example, two cylindrical shafts, preferably with a flat face as large as the width of the mesh, which push and lock the mesh ribbon against a flat surface during the filtration ribbons.

The mesh ribbon 14, owing to the pushing force of the edge, formed from the flat face as large as the width of the mesh, of the two cylinders 25, 26, is pressed, filling the spaces that are present between its links, thus forming a solid cross-section.

The mesh ribbon 14 and the respective cylinders 25 and 26 form a respective barrier that prevents the material from exiting from the filter chamber 7, thus ensuring a hermetic seal of the filtering areas.

This is also true for the ribbon 15 that passes through the filter chamber 8 and is locked by the cylinders 25 and 26, which are similar to the cylinders used to immobilize the ribbon 14.

The shafts for closing the mesh ribbon are placed at the end of the filter chambers 7, 8, so as to isolate them for the entire surface thereof.

Given that the contact surface between the closure surface and the mesh is reduced to an edge, by virtue of the flattened shape of the cylinders 25, 26, on a face thereof, the force necessary to press the mesh ribbons 14, 15 is minimal, unlike conventional devices which use a broader, rectangular cross-section for pressing.

This system also eliminates the danger of encountering differences in the thickness of the mesh 14, 15, which cause the exit of material, problems that are found in conventional filtering devices.

Figure 3:
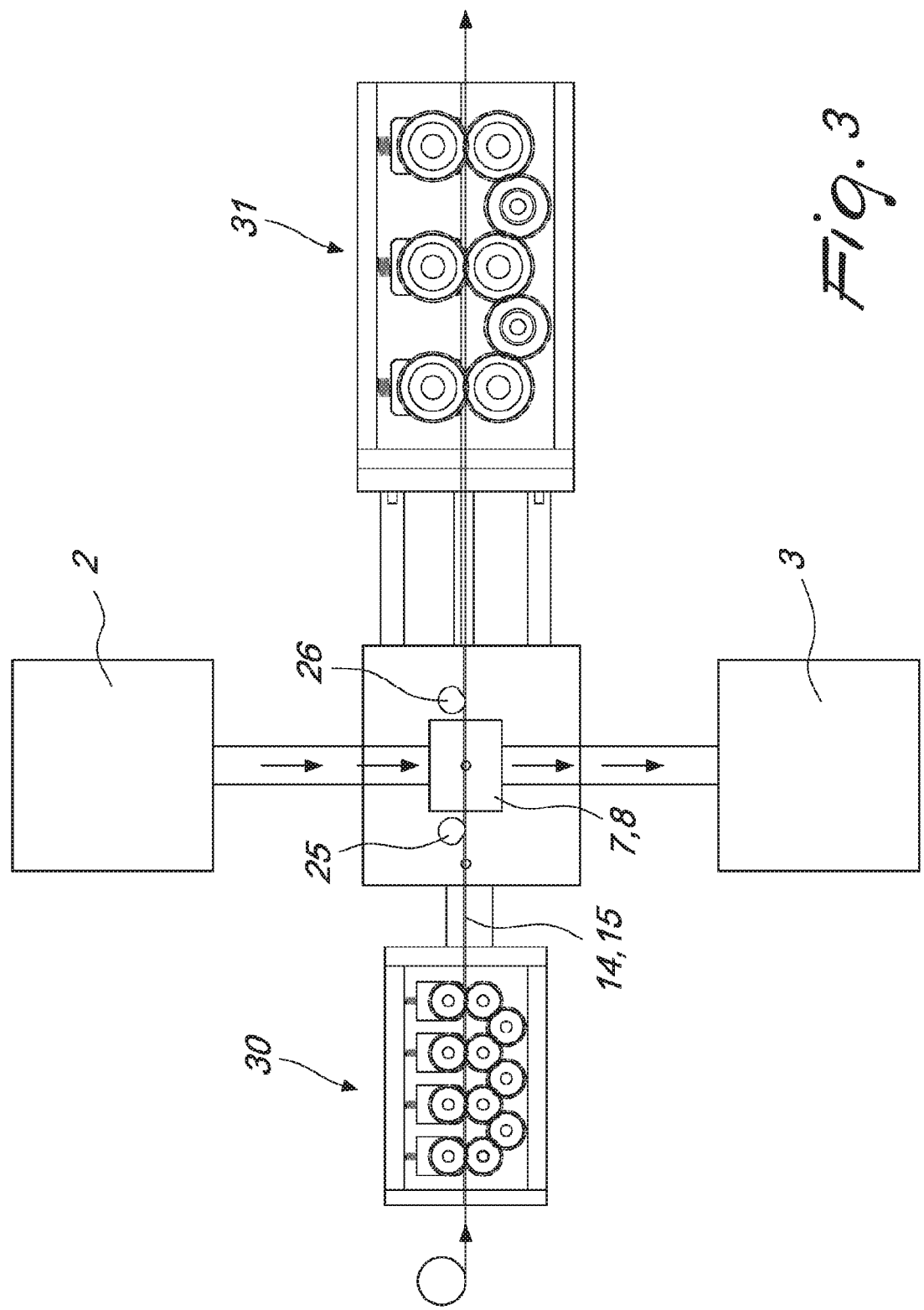
FIG. 3 is a schematic plan view from above of a detail of the filtration device according to the present invention, inserted into an extrusion process.

The filtration device according to the invention further has a pushing/entraining roller system that handles the introduction of the mesh ribbon 14 into the filter chamber 7 and its extraction from the filter chamber 7 through the sliding slots 10, 11. The pushing system is designated by the reference numeral 30 and the entrainment system is designated by the reference numeral 31 in FIG. 3 (with detail shown in FIG. 5). The pushing system 30 is arranged at the start of the slots 10, 11 for sliding the mesh ribbons 14, 15, and the entrainment system 31 is arranged at the exit from the chambers, respectively.

The entrainment system is preferably made up of three fixed toothed rollers 35, 36, 37 and three movable toothed rollers 38, 39 and 40.

The movable toothed rollers 38, 39 and 40 are accommodated in suitable roller supports 50 that run in the direction of the fixed toothed rollers.

Each fixed toothed roller 35, 36, 37 is opposite a movable toothed roller 38, 39, 40 and the latter is pushed toward the fixed toothed roller by virtue of the action of springs 42, 43, 44 which act on the roller supports 50.

The function of the mechanism is to press the mesh ribbon 14, 15 between the toothed rollers 35-40 on the head of the teeth and, by virtue of the rotation of the rollers, entrain the ribbon out of the filter chamber 7, 8 in order to change the filtering surface.

The rotation is induced by way of the action of a gearmotor, which is connected to the shaft of a fixed toothed roller which becomes a driving toothed roller by way of a mechanical connection.

The peculiar characteristic of the entrainment system 31 is the application of toothed crowns that are mounted in axial alignment on the upper part of each toothed roller (both fixed and movable) outside the surface of the ribbon which, by engaging with each other, transmit the rotation induced by the gearmotor to the driving fixed toothed roller and to all the other toothed rollers.

The purpose of the toothed crowns is therefore to transmit the rotary motion, and the purpose of the toothed rollers is to press the mesh ribbon.

In order to transmit the motion of the driving fixed toothed roller to the other two adjacent fixed toothed rollers, use is made of two supplementary toothed wheels, 51 and 52, idle, which are arranged between the fixed toothed rollers 35, 36 and 37 and have the same diameter and modulus as those applied to the fixed toothed rollers.

By way of the idle wheels 51 and 52 the motion of the fixed toothed roller 35 connected to the gearmotor is transmitted to the other two fixed toothed rollers 36 and 37 and further, by virtue of their use, the same direction of rotation as the fixed toothed rollers is obtained.

The ring gear applied on the fixed toothed roller 35 transmits the rotation to the ring gear applied on the corresponding movable toothed roller. This happens for each pair of rollers.

Conveniently, the ring gear mounted on the fixed toothed roller 35 and the ring gear mounted on the movable toothed roller 38 have a size calculated to always engage (interfere) with each other even when the toothed rollers are moved apart owing to the thickness formed by a mesh ribbon or two mesh ribbons.

Therefore, in the traction system in question, in order to prevent the risk of breakage or stripping, the mesh ribbon 14, 15 is made to advance not by engaging the rollers but by virtue of the pressure generated by the force of the springs 42, 43 and 44 which push the movable toothed roller 38, 39, 40 against the fixed toothed roller 35, 36, 37 by pressing on the respective heads of the teeth, without deforming the ribbon.

With regard to the pushing system 30, this is arranged at the entry to the sliding slots 10, 11 and is constituted with the same principle as the entrainment system.

The pushing system 30 is formed by a plurality of fixed rollers 53, 54, 55, 56, opposite a plurality of movable rollers 57, 58, 59, 60 accommodated in movable supports 61, 62, 63, 64.

As with the entrainment system, ring gears, which are applied in axial alignment on the upper part of the rollers, and idle toothed wheels 65, 66, 67 arranged between the fixed rollers 53, 54, 55, 56 are used to transmit the rotary motion to all the rollers.

The movable rollers 57, 58, 59, 60 are pushed toward the fixed rollers 53, 54, 55, 56 by way of the action of springs 70, 71, 72, 73, with the aim of pressing the mesh ribbon.

The pushing system 30 is not connected to any gearmotor and is actuated by the motion of the entrainment system 31 which, by making the old mesh ribbon advance, ensures that the new ribbon is also entrained toward the filter chambers 7, 8.

This is possible because the end of the old ribbon and the start of the new ribbon are pressed by the rollers of the pushing system 30.

Therefore, the mesh ribbon is introduced toward the filter chambers 7, 8 using the sliding of the old ribbon which serves to entrain it, without using bonding.

Therefore, the mesh ribbon 14 advances toward the filter chamber 7, and by virtue of friction it makes the rollers 53-56 and 57-60 of the pushing system 30 rotate.

In order to introduce the new ribbon into the filter chamber 7, its end is brought to the intake of the pushing system 30, and the rollers 53-56, 57-60, by rotating together with the old ribbon, pull the clean mesh ribbon toward the inside of the filtering region.

This is also true for the ribbon 15 introduced into the filter chamber 8 by virtue of the roller pushing system 30.

This operation is safe because the end of the new ribbon 14 or 15 is accommodated at the start of the system in a slot as wide as the height of the mesh 14, 15, the function of which is to guide the mesh inward in axial alignment with the filter chamber 7, 8.

This therefore makes it possible to introduce the new ribbon 14, 15 without making use of bonding between the two ribbons (the old and the new) in order to prevent the drawbacks complained of previously.

Operation of the filtration device according to the invention is as follows.

As part of an extrusion process, between an extruder 2 and an extrusion head 3, the filtration device sees the inflow of material in the intake channel 4 which splits into the first and in the second channel 5 and 6 which lead respectively to the first and to the second filter chambers 7, 8.

From here, the material is made to pass through the first and second output channel 16, 17, in order to be made to converge in the single channel 18 that leads to the extrusion head 3.

The method of carrying out the regeneration of the filtering part with the advancement of the metal mesh ribbon 14 or 15 is as follows.

For the filter chamber 7, for example, the cycle is the following:

firstly, the flow valves 20 and 22 are closed, to isolate and remove the pressure in the filter chamber 7;

then the locking elements 25 and 26 are opened, to release the mesh ribbon 14;

the ribbon is made to advance inside the slot 10 of the filter chamber 7 by a portion of clean mesh equal to the filtering surface.

At this point the locking elements 25 and 26 are closed again, to ensure the seal of the filter.

Finally, the flow valves 20 and 22 are opened to feed the filter chamber 7 again and continue the filtration.

The cycle described above is carried out in a similar fashion for the filter chamber 8.

In fact once the seal of the channel (sliding slot) 10 is ensured and the sliding (flow) of the material through the intake channel 5, it is possible to execute the regeneration cycle in the filtration chamber 8.

In this manner, the filtration process is never interrupted, since one of the two branches of the filtration device is always active when the other is temporarily interrupted in order to make the mesh ribbon advance.

Ultimately, therefore, the output flow is never interrupted because the filter chamber 7 for advancing the ribbon 14 is isolated, while the filter chamber 8 continues to filter material which is conveyed toward the output and which feeds the extrusion head 3 without interruptions.

In practice it has been found that the filtering device according to the present invention fully achieves the set aim and objects, since it makes it possible to obtain a continuous outflow from the filtration device, by obtaining a direct extrusion without redirection of the flow to secondary accumulation cells.

Furthermore, the device according to the invention makes it possible to obtain a constant and regular pressure in output from the device proper, to filter highly pollutant plastic materials of any type, to obtain film as the final product in addition to regranulate, to work with any extrusion process, to eliminate the time lost owing to changing the mesh ribbon, to have a double filtering surface and to obtain a higher hourly production and therefore a saving on processing, as well as a higher quality of the final product.

The filtration device, thus conceived, is susceptible of numerous modifications and variations, all of which are within the scope of the appended claims.

Moreover, all the details may be substituted by other, technically equivalent elements.

In practice the materials employed, and the contingent dimensions and shapes, may be any according to requirements and to the state of the art.

The content of Italian patent application no. 102016000028993 (UB2016A001836), the priority of which is claimed in the present application, is incorporated as a reference.

The invention claimed is:

1. A filtration device for extrusion processes, which comprises:
    a material intake channel, which splits into a first intake channel and a second intake channel;
    a first filter chamber and a second filter chamber, wherein the first intake channel and the second intake channel lead to the first filter chamber and the second filter chamber, said first and second filter chambers being provided in output with a first output channel and a second output channel, which in turn merge into a channel that is adapted to convey the material to an extrusion head, wherein each one of said first and second filter chambers is provided with a slot for sliding a ribbon made of metal mesh; and
    a pushing system arranged upstream of said filter chambers, wherein said pushing system comprises a plurality of fixed toothed rollers that face a plurality of movable toothed rollers, said fixed toothed rollers being adapted to be pushed in contact with said movable toothed rollers by way of the action of springs.

2. The filtration device according to claim 1, wherein said first and second intake channels and said first and second output channels, which are respectively upstream and downstream of said first and second filter chambers, are each provided with a flow valve.

3. The filtration device according to claim 1, wherein each one of said first and second filter chambers comprises, at said slot for sliding a ribbon made of metal mesh, means of locking said ribbon in said slot.

4. The filtration device according to claim 3, wherein said locking means comprise cylinders with a flat face which are adapted to act against said metal mesh ribbon with one of their edges of said flat face.

5. The filtration device according to claim 1, further comprising an entrainment system arranged downstream of said filter chambers.

6. The filtration device according to claim 5, wherein said entrainment system comprises a plurality of fixed toothed rollers that face a plurality of movable toothed rollers, said fixed toothed rollers being adapted to be pushed in contact with said movable toothed rollers by way of the action of springs.

7. The filtration device according to claim 6, wherein said fixed toothed rollers comprise one fixed toothed roller that is actuated by a gearmotor and idle toothed rollers that are arranged between said fixed toothed rollers.

8. The filtration device according to claim 1, further comprising idle toothed rollers arranged in position adjacent to and in contact with said fixed toothed rollers.

9. An extrusion plant comprising an extruder and an extrusion head, comprising a filtration device according to claim 1, interposed between said extruder and said extrusion head.

10. A filtration device for extrusion processes, which comprises:
- a material intake channel, which splits into a first intake channel and a second intake channel;
- a first filter chamber and a second filter chamber, wherein the first intake channel and the second intake channel lead to the first filter chamber and the second filter chamber, said first and second filter chambers being provided in output with a first output channel and a second output channel, which in turn merge into a channel that is adapted to convey the material to an extrusion head, wherein each one of said first and second filter chambers is provided with a slot for sliding a ribbon made of metal mesh; and
- an entrainment system arranged downstream of said filter chambers, wherein said entrainment system comprises a plurality of fixed toothed rollers that face a plurality of movable toothed rollers, said fixed toothed rollers being adapted to be pushed in contact with said movable toothed rollers by way of the action of springs.

\* \* \* \* \*